Feb. 2, 1954 — L. W. ALVAREZ — 2,668,287
RADIO NAVIGATION SYSTEM
Filed June 18, 1948 — 7 Sheets-Sheet 1

INVENTOR.
LUIS W. ALVAREZ
BY
ATTORNEY

Feb. 2, 1954

L. W. ALVAREZ 2,668,287

RADIO NAVIGATION SYSTEM

Filed June 18, 1948

INVENTOR.
LUIS W. ALVAREZ

BY Donald K. Lippincott

ATTORNEY

Feb. 2, 1954 L. W. ALVAREZ 2,668,287
RADIO NAVIGATION SYSTEM
Filed June 18, 1948 7 Sheets-Sheet 3

INVENTOR.
LUIS W. ALVAREZ
BY Donald K. Lippincott
ATTORNEY

Feb. 2, 1954   L. W. ALVAREZ   2,668,287
RADIO NAVIGATION SYSTEM
Filed June 18, 1948   7 Sheets-Sheet 4

INVENTOR.
LUIS W. ALVAREZ
BY
ATTORNEY

Feb. 2, 1954   L. W. ALVAREZ   2,668,287
RADIO NAVIGATION SYSTEM
Filed June 18, 1948   7 Sheets-Sheet 5

INVENTOR.
LUIS W. ALVAREZ
BY Donald K. Lippincott
ATTORNEY

Feb. 2, 1954

L. W. ALVAREZ 2,668,287

RADIO NAVIGATION SYSTEM

Filed June 18, 1948

INVENTOR.
LUIS W. ALVAREZ
BY
ATTORNEY

Patented Feb. 2, 1954

2,668,287

UNITED STATES PATENT OFFICE 2,668,287

RADIO NAVIGATION SYSTEM

Luis W. Alvarez, Berkeley, Calif.

Application June 18, 1948, Serial No. 33,803

20 Claims. (Cl. 343—112)

This invention relates to navigating systems, and particularly to systems for navigating predefined traffic lanes, such as ship lanes or airways.

The broad purpose of the invention is to provide a system which will meet the exacting requirements of airway navigation, as, for example, the requirements of the "ideal system" as defined by the Air Transport Association. With this in view, among the objects of the invention are to provide a navigation system which will: (1) define as many definite tracks along an airway or other traffic lane as may be desired; (2) indicate to the pilot or operator of a vehicle with a great accuracy which track of an airway or other lane a vehicle is on; (3) indicate with sufficient accuracy the distance traveled along such a track; (4) indicate with a high degree of accuracy the deviation of the vehicle from the exact line of such track; (5) require no selection by the navigator of a signal to be received to indicate his position; (6) give all indications as single values which can be read directly, without computation; (7) give continuous indication of position, irrespective of distance traveled to reach such position, and hence build up no cumulative errors; (8) be applicable to straight or curved tracks, as well as to closed holding paths and to junctions between airways; (9) require only a single communication channel for any one airway; (10) require a minimum number of channels for all airways throughout the country, one being sufficient for all lanes except in most heavily congested areas; (11) utilize only thoroughly tested techniques, therefore requiring minimum development and training of personnel for maintenance; (12) require a minimum of equipment on the vehicle, thereby minimizing the airbourne weight, for information supplied, in aircraft applications; and (13) be directly applicable to a coherent system of traffic control.

Other objects and advantages will become apparent hereafter.

The advent of radar has made familiar the process of measuring distances by the timing of the propagation of radio waves, and it has also led to the development of techniques for measuring the extremely short times involved and for the generation of very short radio pulses at accurately timed intervals. It is upon these techniques that my invention is based.

If three radio transmitters are placed at accurately known positions at the angles of a triangle, i. e., not in a straight line, and each of these three transmitters is caused to emit an instantaneous radio pulse of characteristic type at exactly the same instant, there will be one point, and only one, at which these three pulses will arrive simultaneously, namely, the point which is equidistant from all three stations. The pulses might, for example, be of three different frequencies, and devices are available which will respond to the coincidental arrival of three characteristic pulses of such a type. If the pulses are of infinitesimally short duration, the point defined will be truly a point, but if the pulses have a material length, and if a coincidence be defined as any overlap of all three pulses, the definition will be not a point but of an area which depends upon the length of the pulses.

As a next step, any other area whatsoever within radio range of the three transmitters may be chosen, and, by delaying the pulses from the nearer stations by predetermined intervals which are proportional to their differences in distance from the most distant station, the triple coincidence will occur in this new area and in that area only. Carrying the idea one step further, the coincidence of pulse arrival need not be absolute in time, but may, instead, be a "delayed coincidence." The pulses can then be characterized, not by frequency, but by their length, spacing, or other grouping, and a "coincidence" can then be defined by the arrival of coded pulses in a certain definite order within a certain predetermined interval of time. Then, instead of delaying the more distant pulses so as to arrive simultaneously at the selected area, they can be timed so that they will arrive in this area in the interval which meets this latter definition of a coincidence. The arrival of three characteristic signals, then, either simultaneously or in proper order within the proper interval, becomes a code to which a radio receiver may be made responsive, and it may be made responsive to this code only.

In one of its broad aspects the navigation system of my invention comprises the establishment of three radio transmitters in known relationship to the traffic lane which it is desired to navigate. Within such a lane one or more tracks are laid out, and each track is subdivided into successive sections of convenient length, as, for example, one-half mile. A master station, which may be either one of the three already mentioned, or, on the other hand, may be an entirely separate station, sends out recurrent series of uniformly spaced pulses, initiating each series or cycle of operation with a characteristic pulse from which the progress of the cycle may be timed. Whether or not it be used as the master station, one of the three first mentioned transmitters preferably sends out the pulses at a uniform rate. The other two stations, which are here termed the "slave" stations, send out the same number of pulses per cycle, but the timing of the pulses sent out by the two slave stations is varied so that coincidences of the pulses that they transmit occur at successive points along each of the tracks of the lane in succession. The position of any vehicle upon the lane can then be determined either by counting the number of pulses transmitted following the pulse starting the cycle, or else by timing the interval between the start of the cycle and the time when the coincidence occurs.

From another point of view the broad invention may be considered as being the transmission of characteristic pulses from one radio station at predetermined intervals, and transmitting pulses from another station which are varied in time with relation to the time of emission of the first mentioned pulses so as to arrive at predetermined points within a predetermined interval. Using the terminology which has grown up in radar, in this latter aspect the invention might be termed the method of "controlled jitter."

Referring to the drawings:

Figures 3–a and 3–b are diagrams illustrating the method of "smearing" the points of coincidence (so as to cover an area instead of a true geometrical point) in one species of the system, which uses frequency differences to characterize the signals sent out from the respective stations.

Figures 4–a and 4–b are diagrams illustrating one arrangement of pulse patterns which can be used in a single-frequency system, pulse identification being by pulse pattern.

Figure 1:
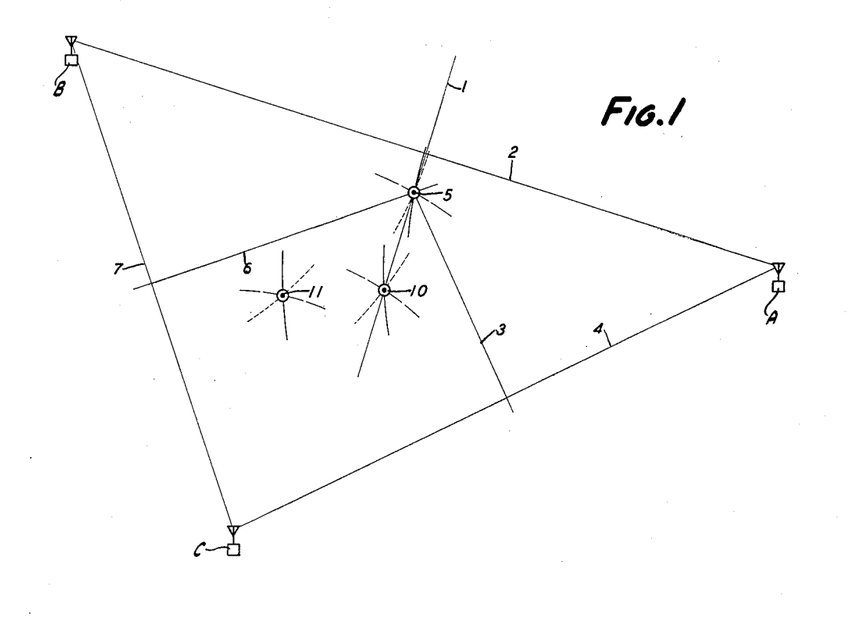
Fig. 1 is a diagram illustrating the principle of operation of the system, the sub-Figures 1–a, 1–b and 1–c showing the times of pulse emission for identification of the points shown on the figure.

Considering first Figure 1, which shows the geometrical basis for the system of my invention, the line 1 is a perpendicular bisector erected on the leg 2 of a triangle which joins radio transmitters identified by the reference characters A, B and C. The line 3 is a similar bisector erected upon the leg 4. These perpendicular bisectors are the loci of points which are equidistant from stations A and B, and A and C, respectively, and it follows that the line 6, perpendicularly bisecting the leg 7 joining the stations B and C, also passes through the point 5 of intersection of lines 1 and 3.

Figure 1A:
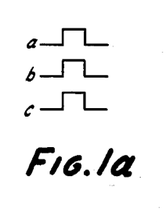
Figure 1B:
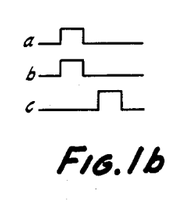
Figure 1C:
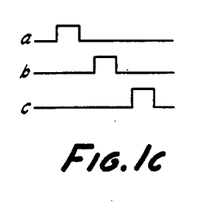

If transmitters A, B and C each emit a short radio pulse at the same instant of time, as is indicated diagrammatically in Figure 1–a (wherein the pulses from the three stations are shown by the letters a, b and c respectively), these three pulses, traveling at the uniform speed of light, will arrive simultaneously at the point 5, and if there is located at this point a receiver which is responsive to the coincidental arrival of the three pulses it will show an indication at this point. Such a receiver would, however, show an indication at no other point whatsoever.

If, instead of emitting all of the three pulses simultaneously, pulses from A and B are emitted at the same instant, but the pulse c from station C is emitted a moment later, the coincidental receiver at point 5 would no longer give an indication, but a receiver located at the point 10, lying on the line 1, but off of the intersection with the line 3 would show such an indication. Similarly, if none of the three pulses are emitted at the same instant, but the pulse from B is delayed a trifle after the pulse from A while the pulse from C is still further delayed, there will be a point 11 at which the receiver would give an indication. Thus, by timing the emission of the pulses from the three different stations, any point desired, within the range of the three transmitters, may be defined.

Figure 2:
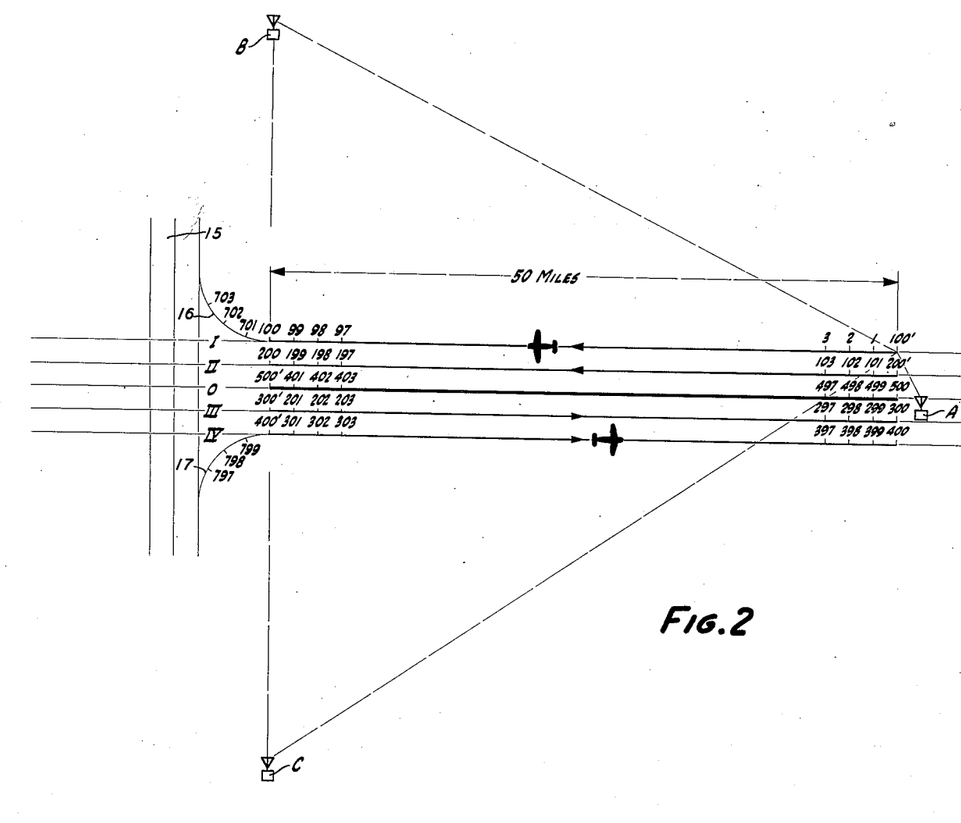
Figure 2 is a diagram of a somewhat idealized system, showing the tracks of an airway, including a curved junction with an intersecting airway.

In Figure 1 I have purposely shown the transmitting stations located at the apices of an asymmetrical triangle, in order to show the complete generality of the system. In Figure 2 a portion of an idealized airway is shown. In this case the three stations are shown as located at the apices of an equilateral triangle, since this is a desirable arrangement from various engineering viewpoints. A reference to the discussion of Figure 1 will show, however, that the symmetrical arrangements of the stations, either with respect to each other or with respect to the airway itself, is not a necessary feature.

The detailed descriptions which follow are intended to illustrate the application of my invention to an idealized airway division. It is recognized that in practice no two airways will be identical, and that to meet varying conditions modifications and compromises will be required in almost every instance. It is also recognized that for the system to attain its maximum usefulness it will be necessary for the airline operators to agree on standard methods of designating flight tracks, maximum division lengths and the like, and that the standards ultimately adopted may not be those here assumed. These have been chosen because they can be realized by using a combination of fully developed and well known techniques, and in describing the equipment and methods employing the assumed conventions and standards and the reasons for the expedients adopted, the principles underlying can be so fully explained that the methods of applying them to other conditions of operation should be fully apparent.

Accordingly, there will be described in turn, (a) the layout of the assumed airway, with designation of the tracks and courses thereon, (b) the waveforms and timing of a pulse code which will give a pilot complete information as to his position on such an airway, by using the three-frequency form of the invention, (c) similar information as to a pulse code utilizing a single frequency, (d) the organization of apparatus which will transmit the required codes at the proper intervals and with the necessary accuracy, and (e) organization of apparatus which will properly recognize, interpret and display the information to be conveyed.

Figure 2 illustrates a 50-mile division of an east-west airway comprising two west-bound tracks I and II, and two east-bound tracks III and IV, separated by a barrier track O which would carry traffic only in emergencies. This section of airway abuts sections to both east and west, and is shown as intersecting a north and south airway indicated by the general reference character 15, which is joined to the division primarily illustrated by a turn-out track 16 into the north-bound track, and another turn-out 17 from the north-bound track of the airway 15 into the east-bound track IV.

The three controlling radio stations A, B and C are located at the apices of a 60-mile equilateral triangle, station A being a master station which is located on the median line of the airway, while stations B and C are slave stations, controlled as to phase and time of emission by station A, and located at equal distances on either side of the airway.

Each track of the airway includes a strip two miles wide, with the true course (the line shown on the diagram) running through it, but not necessarily centrally thereof. Each track is, moreover, divided into sections of convenient length, say one-half mile. With the 50-mile division shown, this would divide each track into one hundred sections, and the points along the division are shown as numbered from 1 to 100, inclusive, for track I, and from 101 to 200, inclusive, for track II, both west-bound, the numbering starting for these tracks at the eastern end of the airway. Point zero of track I, and point 100, of track II, presumably coincide with points 100' and 200' respectively of the preceding division of the airway. The method of avoiding confusion as to this will be pointed out later. Tracks III and IV, being eastbound, are numbered from the other end, starting, that is, at the west, and carry numbers from 301 to 400 and from 401 to 500, respectively, with the same type of differentiation as to the start of the airway section. The barrier track O can be numbered from either end, but in this case is shown as being numbered from west to east, starting with 401 and concluding with 500.

Points on the turnoff 16 are arbitrarily numbered 701, 702 and 703, whereafter the turnoff is shown as merging with the northbound track of airway 15. In like manner, the points on the turnoff 17 from track 15 to track IV are numbered in the 700 series ending with 800. It should be observed here that the numbered points shown in the diagram are not to the scale of the rest of the drawing, but are merely put in to indicate the order of the numbering. It should further be stated that this numbering is chosen purely because it is one convenient method; there is nothing to prevent any order of numbering being chosen. For instance, it might be considered to be of advantage to make all eastbound tracks come in the even-hundred series, while all westbound tracks, were assigned to the odd-hundred series. Neither is there any necessity that the tracks be numbered consecutively. The values chosen here, as well as those for time intervals, length of sections chosen, width of section, and the like, are all selected merely because they are convenient and within easy reach of achievement by presently known methods.

In accordance with the species of my invention first to be described, the stations A, B and C each radiates upon its own characteristic frequency. Station A starts the cycle of operation by emitting a single long pulse, for example, a pulse of fifteen microseconds' duration. It emits these pulses once per second, and each long pulse initiates a cycle of operation of the system. Following this initial long pulse, and at intervals of one fifteen-hundredths of a second it emits a series of regularly spaced pulses, each, in the present example, six microseconds long.

Each of the six-microsecond interval pulses (as these pulses will hereinafter be termed) is alotted to its corresponding point on the airways plot. Thus, the first pulse is allotted to point 1, the second to point 2, and so on down the first track (track I); pulse number 101 is allotted to the first point on track II, and so on down the track.

Each of the slave stations B and C is brought into phase with the master station A at the time of the fifteen-microsecond initiating pulse, this being done (for example) in the same manner as is done in the well-known "loran" system, so that each of these two slave stations starts each cycle in the same predetermined phase relation with the master station A.

The slave stations also send out the same number of pulses per cycle of operation but the actual time of emission of these pulses is so "jittered" (i. e., the intervals between the pulses are varied slightly in length) that the pulses from these stations arrive successively at the points along the airway at the proper instant to coincide with the corresponding pulse from station A. Thus, to slide rule accuracy, station A is 4.71 miles from point 1, station B is 55.95 miles from this point, while station C is 60.25 miles away. The difference in distance between stations A and B is 51.24 miles, while the difference between stations A and C from the same point is 55.54 miles. Light travels .186 mile per microsecond, and therefore station B emits its first pulse about 275 microseconds ahead of the first pulse from station A, while station C emits its first pulse 298 microseconds ahead of the first pulse from A. Similarly, the difference in distance between stations A and B, and A and C, is computed for each successive point along the airway, and the proper time for the emission of pulses from B and C is computed so that the successive pulses will coincide at the successively numbered points along the airway.

It will be assumed here for the present that the cycle of operation chosen is one second long. In order that the system may operate satisfactorily under all conditions it is necessary that the pulse from the master station shall have cleared the slave station before the latter emits the pulse corresponding to the next succeeding coincidence. This follows because the triangle in which the stations are arranged is 60 miles on a side, and the pulses require 323 microseconds to traverse this distance. Accordingly, stations B and C may have to transmit their pulses 323 microseconds ahead of the master station to define a section point in its immediate vicinity. On the other hand, points nearer to the slave stations are defined by slave pulses transmitted after the master pulse.

It is clear that a pulse from a slave station transmitted before a master station pulse can also be considered as transmitted after the preceding pulse, and if the latter has not cleared the slave at the time its pulse is emitted there will be some point at which a false coincidence can be registered. Therefore, to be perfectly safe, the master pulses must be separated by at least twice 323 microseconds, or 646 microseconds. Allowing some leeway in the placing of the stations an interval of 666⅔ microseconds, or 1500 pulses per second, has been chosen as stated above.

It should be noted that it is possible to decrease the intervals between pulses without causing false coincidences by jittering the master as well as the slave station pulses by varying the intervals between them, but this involves complications which, at present, appear unwarranted.

The airway division as laid out comprises five hundred section points. This leaves ⅔ of the one-second cycle which may be shared with two other divisions, or with one other division plus turn-outs or holding courses. By choosing a longer cycle, e. g., two or three seconds, the same frequency channel may be shared with three or six additional divisions. A 300 mile-per-hour airplane covers a mile in twelve seconds, and a two-second cycle would give the pilot three position indications in each half-mile section, which may be enough.

What is desired of the system is that it shall show the pilot of a plane flying the airway when he is on course, and, if he deviates from the course, the direction of his deviation and its approximate extent. It should show him, to wtihin the length of a section, his exact position along the track when he is on course, and although some slight error may be permitted in longitudinal position if he departs from the true course, as long as he remains within the two-mile limit of the track, this error should not be great. It should, of course, give an immediate indication if he wanders into an adjacent track, so that collision with other airplanes, flying other tracks, can be completely avoided.

Figure 3A:
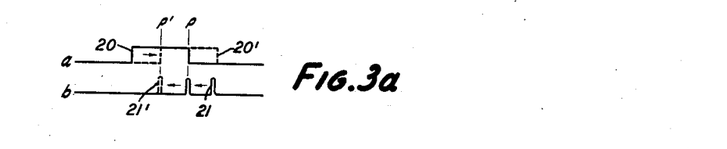
Figure 3B:
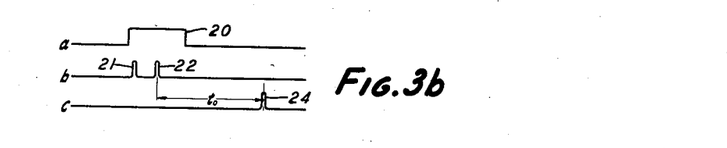

In order that this may be done, and in order, moreover, that there may be no points upon the entire airway where no signal is received, requires proper length and timing of the pulses. Figures 3-a and 3-b show a configuration of pulses which will give the required information for the one-half mile long, two-mile wide, sections which have been postulated for the airway. Figure 3-a shows the pulses, plotted to a space scale, as they are timed to arrive at the section point, i. e., the one-half mile position along the true course which is the point of reference. The length and timing of the pulses are so chosen that a coincidence can be registered at any position on the airway within a distance of one-half mile behind the section point. Actually the length of time within which a coincidence can occur is greater than would be required to cover the exact area defined, so that there will be an overlap covering a portion at least of the preceding section.

It has already been mentioned that the points are identified upon the airplane by counting the number of pulses, or timing the intervals, between the start of the cycle and the time when the first coincidence is registered. The timing arrangement is so devised as to register the first coincidence recorded, and since the points are defined in regular serial order, along the course of the plane, it is of no moment if the length of the coincidence interval is so great as to cover any amount of the course already traversed. It is only necessary that the coincidence be first registered at the section point in order that the proper indication may be given.

In the present instance, therefore, it is desired that a coincidence between a given group of pulses be recognized over the one-half mile section of the track, plus a reasonable overlap, and the six microsecond length of pulse from station A was chosen for that reason. This pulse, the pulse 20 of Figure 3-b, is emitted from station A. A series of two short pulses, 21 and 22, is emitted from station B, so timed that the pulse 21 will arrive at a particular section point at the same instant as the leading edge of pulse 20. The second short pulse 22, follows the pulse 21, from the same station, at a short time later, e. g., three microseconds.

The pulses travel outward, spherically, from their respective stations. Pulse 20 is 1.116 miles long, that is, its leading edge, traveling at 186,000 miles per second, has reached this distance away from the transmitting antenna before the last oscillation comprising it is finally emitted. The two pulses first meet on the direct line between the two stations, and the situation here, as it exists in space, is shown in Figure 3-a. Pulse 20, traveling in the direction of the arrow (toward the right), meets pulse 21, traveling in the directions of the arrows of the lower graph (toward the left), at some geographical point p. Three microseconds later pulse 20 has traveled forward to the position shown by the dotted pulse 20', while pulse 21 has traveled an equal distance toward the left, in the position shown by the dotted pulse 21'. This is at a geographical point p', which is half the length of the pulse 20 away from the point p where the first coincidence occurs, and is the last point at which a coincidence can be observed. The distance between p and p', being one-half of the length of the pulse 20, is .558 mile which is ample to give the one-half mile section length, plus a reasonable overlap.

As the circles defining the edges of the respective pulses move outward, the hemispherical shells defining their leading and trailing edges pass through each other, and, as the coincidence occurs farther and farther away from the point of first coincidence, the wavefronts make increasingly great angles with each other. There is thus defined a zone wherein a double coincidence of this type can be observed, and it can be shown that the width of the zone is $$\frac{\Delta t c}{2 \cos \theta/2}$$

where $\Delta t$ is the sum of the lengths of the pulses, and $\theta$ is the angle between the wavefronts (i. e., the angle between their two tangents) and $c$ is the speed of light.

Figures 5, 10:
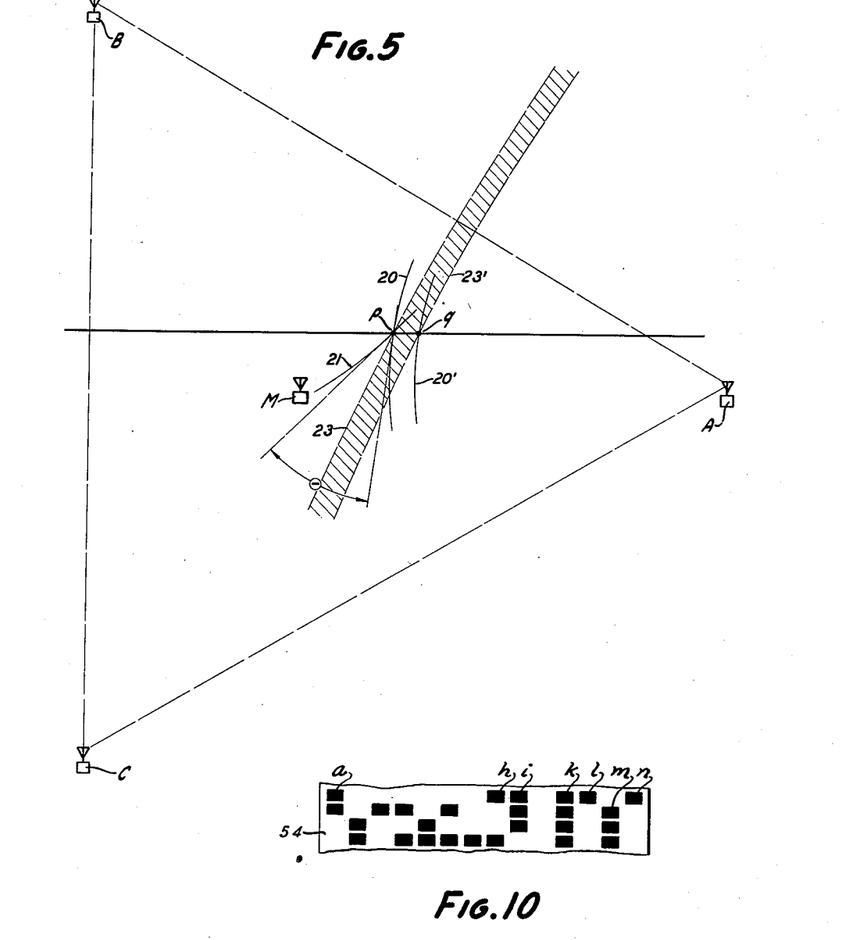
Figure 5 is a diagram illustrating (not to scale) the nature of the areas defined by the pulse patterns used.
Figure 10 is a drawing of a portion of a programming strip or band as used to control the jitter of a slave station.

This is illustrated in Figure 5, which shows the situation at a point p on track I where a coincidence is to be observed. The arcs 20 and 21 indicate the position of the wavefront of the pulses similarly designated in Figure 3-a, where the coincidence first occurs on the course I. The arm 20' indicates the position of the retreating wavefront when the coincidence can last be observed along the track I. At the point p the wavefronts meet with the angle $\theta$ between the tangents to the respective wavefronts at this point. The lines 23, 23' define the hyperbolic zone within which the coincidence may be observed. The width of this zone, as measured along the course, is considerably over one-half mile, but this merely means an increased overlap and does no harm. It will be recognized that in space the zone of coincidence is a hyperboloid of revolution around the axis defined by the line between stations A and B.

The width of the various tracks is defined by coincidence of the pulses between stations B and C. It is desired to define a track that is two miles wide. At the western end of the track the pulses meet head-on, that is, that the angles between the wavefronts is zero, and according to the formula given above a pulse of twenty-two mecroseconds is required to define the track. At the eastern end of the track, however, the pulses meet at an angle of 120° between the wavefronts, and accordingly the length of pulse required to define the track is only eleven microseconds, and the twenty-two microsecond length, required by the conditions at the western end of the track will give a track that is four miles wide.

In the case of the lateral definition of the track, however, instead of using a pulse of the actual length required by these computations, the coincidence of pulses 20 and 21 is utilized to sensitize the receiver for the following pulse 22. The latter starts a timer, and sensitizes the receiver further for a period of the length of the computed pulse, twenty-two microseconds, and a coincidence is recorded if the pulse 24 arrives at any time within this period. The arrival of such a pulse stops the timer, and an indication is given as to the interval following the pulse 22, within which pulse 24 arrived. If this interval is less than some standard time $t_0$, the device indicates that there is a deviation to the left of the course, whereas if the period is longer than $t_0$, but still within the total interval during which the receiver is sensitized, it indicates that the plane is to the right of the true course.

In the case of the lateral definition of the tracks it is not possible to ignore the degree of overlap, as it is in the case of the longitudinal readings, since it is not the first coincidence that is measured, but a time within the period of coincidence. If the true course is to be centered within the two-mile track at the western end of the course, the time $t_0$ should be eleven microseconds. If, however, this length is adopted, the width of the zone of coincidence at the eastern end of the course would be four miles instead of two, and a coincidence intended for track I could be observed on the course of track II, and since the indications for track I are given first, it would be the track I coincidence that would be registered instead of the track II coincidence.

A compromise is therefore necessary, and several such are possible. One of these would be to spread the tracks farther apart at the eastern end of the course and since the divisions of an airway would probably be placed back-to-back, the spreading in one division would coincide with the spreading of the next, and no serious trouble would result.

A different compromise, but one believed to be more desirable, is to keep the total period for which the receiver is sensitized by the pulse 22 at twenty-two microseconds as before, so as to give a full two-mile width of course at the western end of the track, but to make the time $t_0$ constant at 5.5 microseconds. This would bring true courses I and II within one-half mile of the southern border of their respective tracks at the western end of the course, instead of on their median lines. At the eastern end of the course, however, the track I coincidences would no longer overlap track II. The track II coincidences would overlap track I, but as track I records first there would be no interference as a result. In accordance with the rule of the road universally adopted in this country, namely, "keep to the right" standard operating procedure would be to deviate in this direction if deviation were necessary and the narrowing of the track to the left is therefore unlikely to cause any difficulty.

Figure 4A:
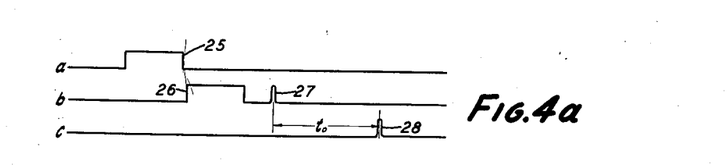

Stations A, B and C can all be operated upon the same frequency if some pulse-coding system such as shown in Figure 4–$a$ is used. In this case the pulse 25 from station A can be a six-microsecond pulse of the same character as that transmitted from station A in the three-frequency system. The pulses transmitted from station B (or C) comprise a six-microsecond pulse 26 followed, after a three-microsecond interval, by a short pulse 27. The pulse 26 is timed to arrive at the section point immediately after the conclusion of pulse 25. Station C (or B) emits a single pulse 28, timed to arrive at the station point at the time $t_0$ after pulse 27.

Figure 4B:
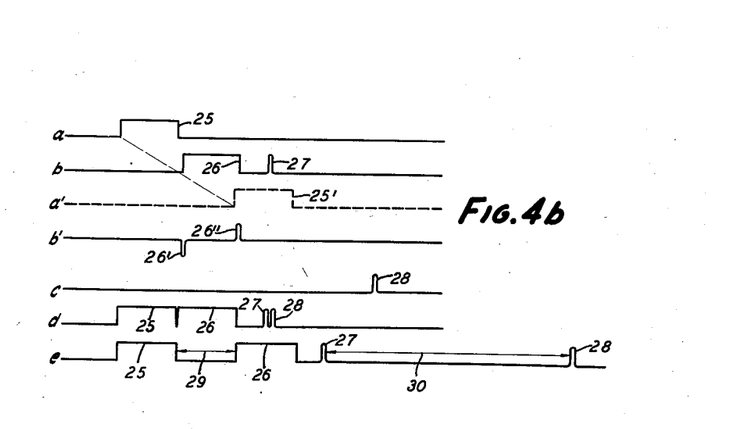

If this method of coding be chosen the receiver on the plane is designed to accept six-microsecond pulses but to reject shorter ones unless otherwise specially sensitized. A portion of the pulse 25 is passed into a twelve-microsecond delay circuit, as is indicated by the dotted pulse 25' in Figure 4–$b$. After passing through this delay circuit it opens a gate. Pulse 26 is also accepted by the receiver, as it also is six microseconds long. The effective portion of this pulse passes into a differentiating circuit, which converts it into short pulses indicated at 26' and 26'' in Figure 4–$b$, pulse 26' representing the leading edge of pulse 26 and 26'' representing the trailing edge of the same pulse. Since the pulse must be six microseconds long to be accepted by the receiver, the trailing edge is used for recognition, and if this arrives at any time between 12 and 18 microseconds of the arrival of the leading edge of pulse 25, it will register a coincidence with pulse 25', as shown. Pulse 26'' is applied to the gate opened by pulse 25', and sensitizes the receiver for the ensuing pulse 27. This starts the timer, which operates until it receives the pulse 28, in the same manner as in the case of timing pulse 24 in the preceding example. This will be clearer when the receiver circuits are considered in detail, below.

Curves $d$ and $e$ of Figure 4–$b$ indicate the limits between which pulses, as they arrive at the receiver, will be recognized and give an indication. Curve $d$ shows the pulses as received at the section point, west-bound, with the plane at the extreme south of the track. Curve $e$ indicates the pulse pattern at the extreme easterly and northerly position where a coincidence will be registered. The dimension lines 29 and 30 indicate the extent of possible time variation, but the variation permitted in time of arrival in pulse 28 is with respect to pulse 27, and this is also variable to the extent indicated by dimension line 29. It can be shown that with this pattern no false indication is possible. It can also be shown that the delays involved do not affect the intervals required between pulses, except to the extent of the six microsecond latitude in the recognition of the double coincidence, which must be added to the 646 minimum, making it 652 microseconds. The 666⅔ microsecond interval adopted is therefore adequate.

It will be noted that while pulses 25 to 28 inclusive do not coincide in space, their effects do coincide in time within the receiver. This illustrates clearly what is meant by the term "delayed coincidence." The idea is a familiar one in certain arts and the term is one which has become accepted. Therefore, throughout this specification and claims, the term "coincidence" is to be construed as broadly covering either a coincidence in space or a delayed coincidence of the type here mentioned.

Figure 6:
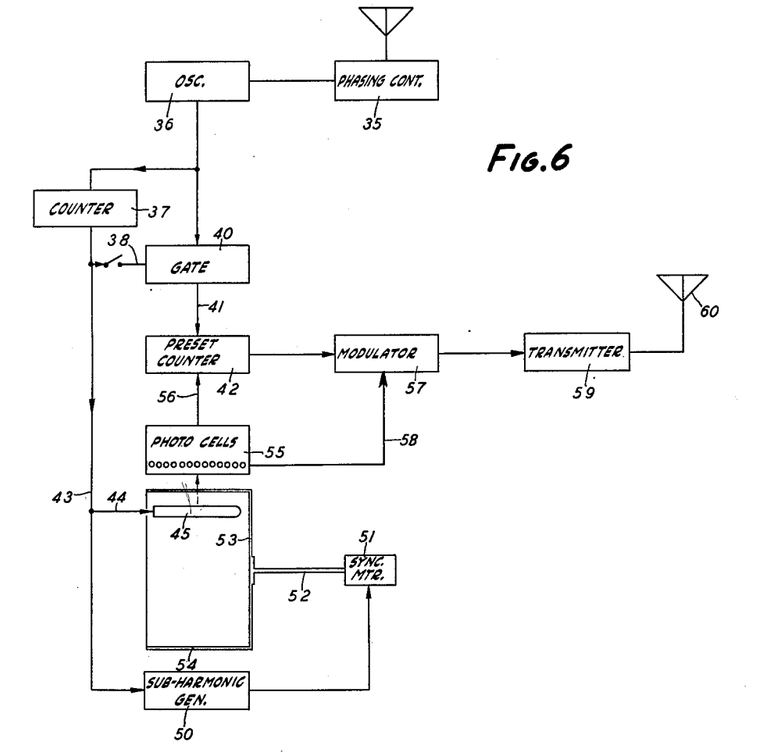
Figure 6 is a block diagram showing the equipment at a slave station in the system.

An organization of equipment capable of transmitting the pulses with the required degree of accuracy as to time is illustrated in block form in Figure 6. In this diagram the reference character 35 indicates the oscillator phasing control which is used to time the phasing of the slave station to the master, as is well known in connection with the loran system of navigation. The phasing impulses received by the control receiver 35 are passed to a crystal-controlled oscillator 36, operating on a frequency of three megacycles per second.

Sine-wave impulses from the oscillator are fed into a high speed counter 37. The type of counter proposed for this is an adaptation of the Eccles-Jordan "flip-flop" counting or scaling circuit, which is familiar in connection with electronic computing devices and with scaling circuits utilized in connection with the Geiger-Müller counters used in nuclear physics. The counter proposed in the present instance is a scale of 2048 device, comprising eleven binary or "scale of two" stages. Such counters are available which will register sine-wave impulses up to five megacycles per second, and hence the 3 megacycle oscillations from the oscillator 36 can readily be handled by them.

A scale of 2048 is considered preferable here, because of its simplicity as compared with one which would register exactly 2000 oscillations, although the latter could, of course, be used. It sends out a pulse every 2048 oscillations of the oscillator 36, and this defines the intervals at which the pulses from the master station are transmitted. If the oscillator 36 operates at exactly 3 megacycles the counter 37 will require 1.024 seconds to transmit the 1,500 pulses which are assumed here as comprising the entire cycle of operation of the system. This is, of course, longer than the one-second cycle that has heretofore been referred to, but there is no compelling reason why the cycle should be exactly of one-second length. Should this prove to be required for other reasons there are two ready methods of meeting the requirement; either the oscillator 36 can be made to operate at slightly higher than 3 megacycles, i. e., at 3.072 megacycles, or a scale of 2000 counter can be used instead of that here assumed. If the former expedient were adopted the proper modification would have to be made in the illustrative computations hereinafter given, but in the remainder of this description it will be assumed that the cycle is actually extended to the degree mentioned.

The counter 37 transmits, therefore, a pulse every 666⅔ microseconds, which is fed through the line 38 (the switch in this line being normally closed) to a gate 40, which blanks, for five-microsecond intervals at each pulse, a line 41 feeding from the oscillator 36 to a second counter 42 of the same type as the counter 37, that is, a second scale of 2048 counter. This latter counter differs from counter 37 only in that it may be preset to any number of counts, so that it will count out and transmit a pulse in a period equal to 2048 counts minus the number of counts preset upon it.

The pulses from counter 37 are also fed through lines 43 and 44 to a high-speed light source 45, such as a stroboscopic lamp. This lamp, therefore, flashes briefly at regular intervals which are equal to those between the interval pulses from the master station.

The pulses from the counter are also fed to a subharmonic generator 50, which, synchronized by the interval-frequency pulses, generates a sine-wave of suitable amplitude and frequency to operate a synchronous motor 51, and the latter, through a shaft 52, drives a drum 53 at a speed of three revolutions per cycle. During one revolution it is active to send out its signals; but the other two revolutions occur during the portions devoted to other curses.

The rim of the drum comprises a programming strip 54, wherein there are formed holes or slots arranged, in this instance, in fourteen circumferential rows. A group of photocells 55, are arranged in apposition to these rows of holes, so that when the light source 45 flashes those cells which are exposed through the holes are excited and transmit pulses through the channel 56 to preset the various stages of the counter 42. The binary stages of the counter read either 0 or 1; a hole will set the counter to 1, whereas the absence of the hole before that particular photocell will leave it at 0. Photocells Nos. 12 and 13 are utilized to determine which type of pulse is transmitted from the particular stage, either the double short pulse corresponding to pulses 21 and 22 of Figure 3, or the single delayed pulse in the three-frequency system, or the corresponding codes in a single-frequency system. It is desirable that the indication that is given on the plane as to whether it be right or left of the course be the same irrespective of the direction in which the plane may be flying, and therefore a reversal of the form of signals as between stations B and C must be made as between east and west-bound courses to accomplish this. The 14th photocell can be used to actuate a scale-of-three ring counter actuating a relay which cuts off the transmitter during all but the first 500 intervals allotted to the division here primarily under consideration.

It will be seen that the actual timing of the system is accomplished by pulsing the light 45, and all that is required in synchronizing the motor is that the holes be approximately centered on the photocells when the pulsing occurs, which can readily be accomplished.

The signals from photocells Nos. 12 and 13 are fed into a modulator 57, this control being indicated by the line 58. The counter 42 feeds a pulse into the modulator each time it counts out, and this pulse initiates the signal emitted by a transmitter 59 and the antenna 60.

It should be understood that the drum mechanism here described is only one of various methods by which the programming strip may be passed before the photocells. Various other types of mechanism may be used. For example, the programming strip may be printed upon a photographic film, and run through a mechanism which is comparable to a multiple sound head of the type generally used on motion picture projectors. Various other methods of pulsing may be used, which do not use photocells at all. For example, a magnetic record can be used, or a series of holes punched in an insulating tape, through which feelers establish actual electrical contacts, such as is used in statistical business machines. The type of programming band here suggested is chosen because of the fact that it is not one which would be affected by mechanical wear, and is accordingly very rugged and reliable in operation.

The holes in the programming strip, besides being arranged in lines corresponding to the thirteen photocells, are also arranged in rows parallel to the axis of the drum, one row being provided for each pulse to be transmitted by the station. It is also to be understood that in certain of these "rows of holes," the holes may be omitted entirely, as, for example, where a short course, fragmentary course, or holding course is to be controlled during a certain portion of the cycle, and no signals are transmitted during the remainder thereof.

With this arrangement pulses from the counter 37 come at the same rate as the interval pulses from station A, but not necessarily in phase with the latter. These pulses establish the base from which the lead or lag of the pulses from the slave station are measured. The maximum amounts of lead or lag depend upon the differences in distance from the point to be established from the respective stations. The nearest point to station A is point 500 on track O, which, in the present case, is 2 miles from station A and 58.4 miles from stations B and C, the difference being 56.4 miles. To establish a coincidence at this point, the signals from stations B and C must be emitted 303 microseconds "ahead" of the pulse from A, or 909 counts ahead. The other extreme case is point 100 on track I, which is 26 miles from station B and 52.2 miles from station A, a difference of 26.2 miles. Station B must, therefore, emit its pulse corresponding to point 100, one hundred forty-one microseconds, or 423 counts "later" than the pulse from A. There is, therefore, a total cumulative difference in the time of emission of pulses from stations B and C, with respect to those emitted from station A, of 1332 counts.

The equipment is capable of advancing the time of emission, but not of retarding it, and therefore, in order to take care of the total variance in time, the counter 37 must be phased at least 423 counts later than the interval pulses from station A. The exact amount of this lag is not important, but a convenient amount would be 500 counts, and this will be assumed in the examples to be given.

As has already been indicated, point 500 requires an advance of 909 counts from the interval signals from A, plus an additional 500 counts due to the lag in setting of the counter 37, or a total of 1409 counts. The programming band must therefore be arranged to preset 1409 counts for this particular point, and a portion of the band, showing this, is illustrated in Figure 10. The figure 1409 is equal to $2^0$ plus $2^7$ plus $2^8$ plus $2^{10}$. This requires the presetting of stages 1, 8, 9 and 11. Accordingly there are holes in the 1st, 8th, 9th and 11th lines of the programming strip, these holes being designated in the drawing by the characters $a$, $h$, $i$ and $k$ respectively. Since track O has been assumed to be an eastbound course, there is also a hole $l$ in the 12th line, to cause the emission of a delayed single pulse 24 (Figure 3), but none in the 13th which would cause the emission of the double pulse 21, 22, or the corresponding single frequency code. A hole $n$ is also shown in the 14th position, as marking the end of the cycle so far as this particular division of the airway is concerned.

The second line of holes in the figure shows the arrangement of the programming strip for point I on track I. The positioning of the holes is computed in the same manner as before, but this being a westbound track, there is no hole in the 12th line, but, instead, a hole $m$ in the 13th line. There will be no hole in the 14th for any of the remaining points upon this division of the airway. The 3rd and 4th rows of holes are determined in the same manner.

Although the equipment just described has been referred to as that at a slave station, and it has been assumed that station A was the master, it should be recognized that the timing equipment for all three of the stations can be located at a single point, and that station A can, itself, be a slave station. If all three of stations A, B and C be made slave stations, the master station may be located at any point desired, and the three slave stations may be made merely responder beacons, set to transmit their required type of signals whenever they receive properly coded pulses from the master. In this case the time of propagation of the waves from the master to the three slave stations has to be taken into account in computing the programming of the signals, as well as the time required for the response mechanism at the beacon station to operate. The transmission from the master station to the three slaves can then be either by wire line or by radio, and the radio can operate on the same frequency as the slave stations themselves, provided only that the controlling pulses for the slave stations were given a code form which could not possibly be simulated by any coincidence of the signals from the slave stations, and which could not, in themselves, simulate the control station code.

Figure 7:
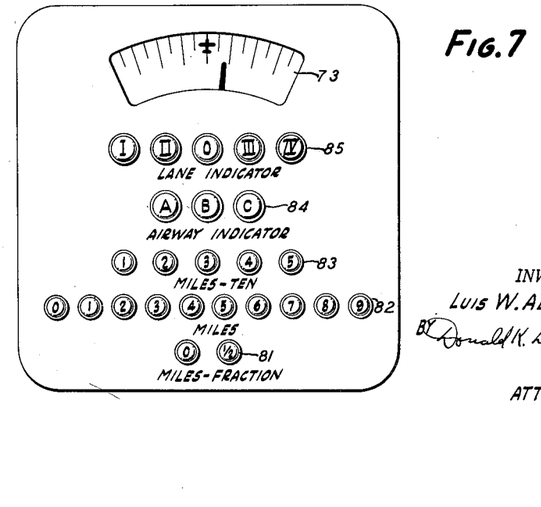
Figure 7 is a showing of one form of airplane indicator as used with the system of this invention.
Figure 8:
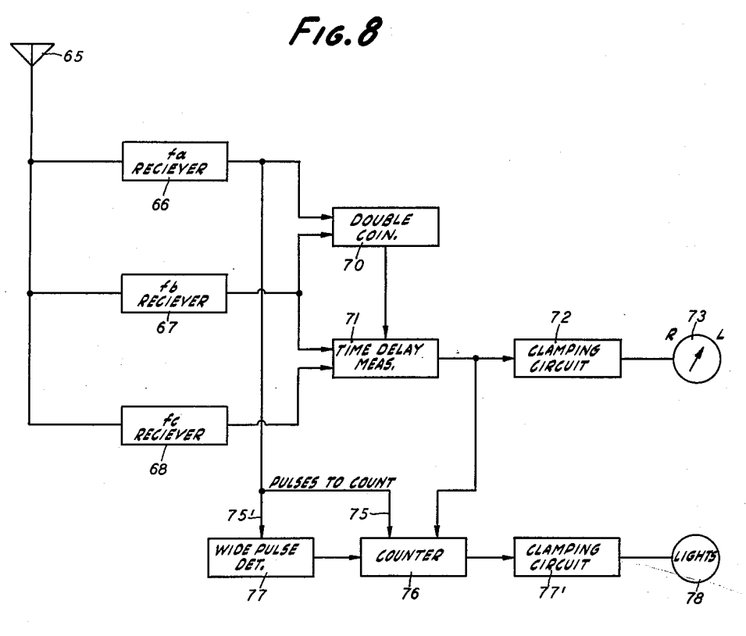
Figure 8 is a block diagram of a three-frequency airplane receiver and indicator.

Thus far the equipment utilized on the plane to detect and interpret the coincidences has been referred to only indirectly. Figure 7 is an illustration of one form of indicator for use on the plane, and Figure 8 is a block diagram of the associated circuits as used with the three-frequency systems. An airplane antenna 65 feeds three receivers 66, 67 and 68, for receiving the frequencies $f_a$, $f_b$ and $f_c$ from the three transmitting stations A, B and C. Receivers 66 and 67 feed the respective pulses, after detection, to a double-coincidence detecting device 70, which, when it detects a coincidence, gates a circuit which results in the passing on of pulse 22, arriving three microseconds after the coincidence, to the time-delay measurement circuit 71. The receiver 68 detects the pulse 24, and passes it also to the time-delay measurement device 71. The arrival of pulse 24 within the twenty-two microsecond period during which it must arrive to be recognized actuates a clamping circuit 72, which passes the measurements on to the right-left indicator 73. This indicator is of the type quite frequently used in aircraft instruments, wherein the needle indicates the course, and the central point or zero indicates the position of the plane. Thus, when the needle swings to the right, as is shown in the figure, it indicates that the plane is to the left of the course.

Pulses from the receiver 66 are also fed through the channel 75, to a counter 76. They also pass through a channel 75' to a wide pulse-detecting circuit, 77, which, when it detects a wide pulse, passes it on to the counter 76 to zero it and prepare it for the ensuing cycle.

For airways organized in accordance with that which has been discussed herein, the counter 76 consists of, first, a binary stage, second a decade stage, third, a scale-of-five stage, fourth, a second scale-of-five stage, and finally, a scale-ofthree stage, after which it would recycle. A pulse from the time-delay measurement circuit 71 is also fed to a counter 76, stopping its operation, and transmitting the reading of the counter through the clamping circuit 77' to the lights 78.

The lights shown collectively by the reference character 78 in Figure 8, are indicated by the various rows of lights numbered from 81 through 85 on Figure 7. The lights shown in Figure 7 are those normally associated with counting circuits of the Eccles-Jordan type to indicate which tubes of the counter chain are so excited as to register a digit in the system of the numeration employed, whether binary, decade, or other, and are usually neon glow tubes, each connected in parallel with the resistor in the plate circuit of that tube of each pair which does not carry current when a digit is registered thereon as to be lighted when such digit is registered and extinguished at all other times. One row of lights corresponds to each of the stages mentioned in the counter. These lights are arranged to show the distance flown along the course directly in miles. The lowest row, 81, shows which of the tubes in the scale-of-two counter is actuated at the time the clamping takes place and indicates either zero or one-half mile, corresponding to whether the section point for which the coincidence is measured is even or odd. The next row, 82, indicates the number of units of miles along the course, in accordance with the decade stage next following. The third row shows the tens of miles along the course, up to fifty, the maximum length of course on the airway. The following scale-of-five stage is registered on the top line of lights 84, and this indicates which lane of the airway the plane is flying. It is to be noted that the arrangement of lights in this upper row is not in accordance with the actual number counted, since the indicator for lane I is set up by counting through the entire previous cycle, lane II is set up by counting through the entire number of points on lane I, etc.

The final scale-of-three stage is indicated by the second row from the top, row 85. In the diagram this is shown as a three-airway system, on the basis of the one-second cycle described; should a two-second cycle be used there would be six lights in this row. The airway indicator lights are also set up in the same manner as the lane indicators, by the completion of the preceding airway, rather than by the completion of the airway bearing the designation of the one lighted.

It would be possible to use a mechanical odometer or counting system instead of the light method that is here described. I prefer, however, to use the light indicators rather than the mechanical system, since the former permits a complete resetting at each cycle, and the indication does not depend upon a rapidly recycling counter. With the system here shown a transition from, say, track I to track II would be indicated instantly, and it would not be necessary to count back in case the plane immediately returned from track II to track I.

Figure 9:
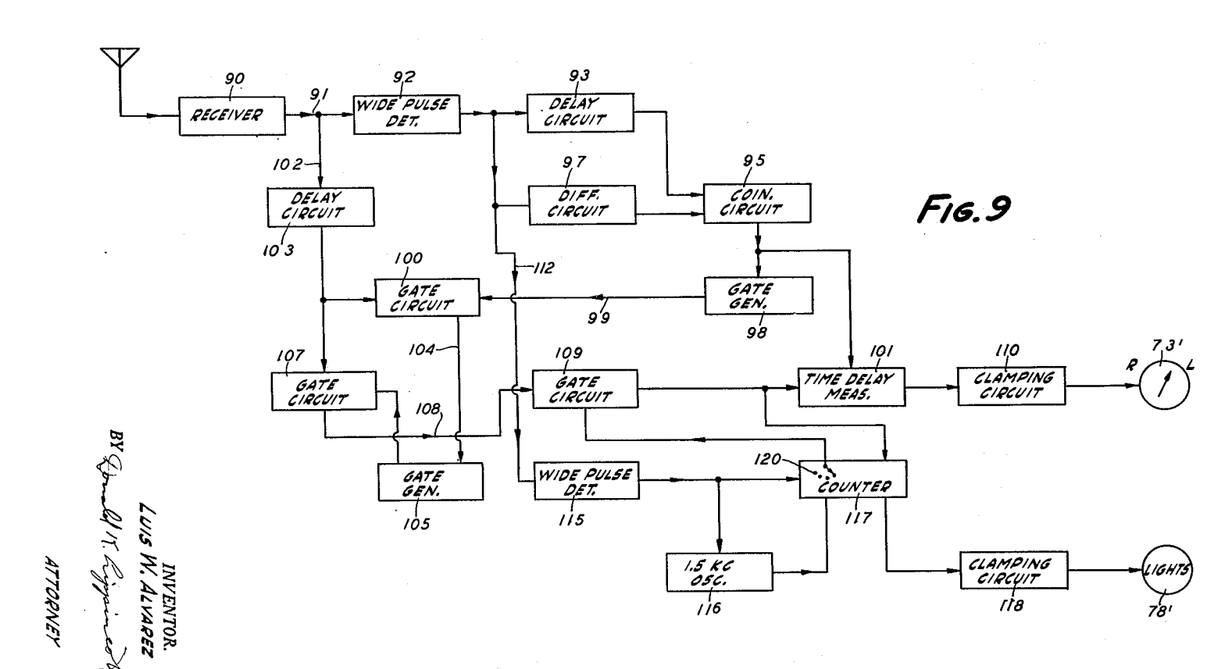
Figure 9 is a block diagram of a single frequency plane receiver and indicator.

It is obvious, also, that the odometer lights can be arranged to show the distance to be flown along the course as readily as the distance flown.

Where a single frequency, instead of the three-frequency modification of my system, is to be used, somewhat different elements have to be used on the plane. One organization of equipment capable of doing this is illustrated in Fig. 9. Here all of the signals from the three stations are picked up by a single receiver 90, and, after detection, are passed on through a circuit 91 to a wide pulse detector 92, which discriminates against all pulses narrower than six microseconds, but passes on pulses of this length or longer. The pulses passing the wide pulse detector 92 are fed to a delay circuit 93, which delays them for twelve microseconds, as previously described, and then feeds them to a coincidence circuit 95, to open a gate therein.

The output of the wide pulse detector 92 is also fed to a differentiating circuit 97, which differentiates the pulses and passes them, without delay, to the coincidence circuit 95. As described in connection with Figures 4–a and 4–b, if the trailing edge of the pulse 26 arrives while the gate of the coincidence circuit 95 is open, the latter passes a pulse on to a gate generator 98 and after three microseconds this gate generator sends a short (say half-microsecond) pulse through channel 99 to gate circuit 100. The pulse from the coincidence circuit is also passed to a time-delay measurement circuit 101, to start its operation.

In the meantime, all signals detected by the receiver 90 have been applied through a channel 102, branching from channel 91, to a six-microsecond delay circuit 103. The purpose of this circuit is to give the wide pulse detector 92 time to operate and determine whether the pulses are of the requisite length, since a six-microsecond delay is obviously necessary for this purpose and is included in the wide pulse detector. The pulses having been brought into step again by delay circuit 103, they are fed in their proper order to gate circuit 100. If the two pulses which cooperated to operate gate generator 98 are, in fact, pulses 25 and 26, they will be followed three microseconds later by pulse 27, which will arrive at the gate circuit 100 at the same time as the gate from the generator 98, and will pass on a short pulse through channel 104 to a gate generator 105, the latter operating to pass a twenty-two microsecond gate to open gate circuit 107. If pulse 28 arrives while this gate is open, it will be passed on through channel 108 and a normally open gate circuit 109 to the time delay measuring circuit 101. The arrival of this pulse operates to clamp the indication of circuit 101, by means of clamping circuit 110, and pass it to the right-left indicator 73'. If pulse 28 does not arrive, circuit 101 dumps its indication, and indicator 73' remains set to its last indication, while circuit 101 is ready to start operation at the next double coincident.

It is to be understood that the wide pulse detector 92 will pass all pulses longer than six microseconds. Besides feeding these longer pulses to the delay circuit 93 it also feeds them through a channel 112 to a second wide pulse detector 115, operative to recognize pulses of fifteen microseconds and pass them on to synchronize a fifteen hundred cycle oscillator 116 and also to reset to zero a counter 117, which is in all essentials similar to counter 76 as used in the three-frequency system, but which counts cycles from the oscillator instead of received pulses from the master station.

The timing pulse passed to circuit 103 through gates 107 and 109 when the coincidence circuit 95 operates is fed to counter 117 as well as to the time-delay measuring circuit 101. This pulse stops the counter 117 and actuates the clamping circuit 118, transferring its reading to the lights 78' as before.

It has previously been pointed out that the indicating equipment on the airplane recognizes only the first triple coincidence to occur within each cycle of operation, and ignores all later triple coincidences, and much of the flexibility and reliability of the invention depends upon this fact. There are, however, circumstances in which it may be desirable, or even necessary, to ignore the first triple coincidence and to recognize one occurring later. This can be done with the equipment shown in Figure 9, at the option of the pilot, whenever he desires to follow a holding course or to take a turn-out, or where two air lanes cross which are on a time-sharing basis.

In order to accomplish this in the desired manner, the counter 117 is used as a gate generator. In any stage of any flip-flop counter there are available two potentials, one positive and the other negative, which reverse each time that particular stage is operated. By selecting the proper stage and the proper sign a potential is always available which will open a gate only during the portion of the cycle when that particular stage is flipped, or, if desired, which will open the gate at all times except when that particular stage is flipped.

In accordance with the method which I prefer for selecting later impulses within a cycle I provide a switch 120 on the counter 117 which connects, preferably, with the ternary stages of the counter that operates the "Airway" indicators. This switch is normally set to a zero indication, which applies a constant potential to the gate circuit 109 holding this gate open. All turn-outs and holding courses are preferably assigned to the portion of a cycle alloted to, said, Airway "C." The switch 120 can either be connected so that it will open the gate circuit 109 only during the portion of the cycle allotted to any specific airway, or it can be connected so that it will exclude triple coincidences in the portion of a cycle allotted to one airway. Thus, if a pilot is flying Airway "A" and desires to take a turn-out, he may either set the switch 120 so as to exclude indications from airway "A," thus picking up indications from Airway "C," or, should he stray onto it, Airway "B," or he can set the switch so as to pick up indications from Airway "C" only.

If a different length of cycle is adopted, so that additional airways can be accommodated within it, the same principle can be extended to cover this condition. It should be obvious that if desired the apparatus may be arranged so as to include (or exclude) only one lane, instead of one airway.

In the explanations and examples of the system of my invention, it has thus far been assumed that the courses would be laid out upon the ground, and the earth has been treated as a plane instead of a spherical surface. The errors and approximations introduced due to the latter cause are probably insufficient to cause any difficulty in any practical case in a course no more than 50 miles long, but if they were considered to be important, it would, of course, be possible to treat the computations spherically, using, in addition, proper corrections for the refraction of the radio waves in the lower layers in the atmosphere.

The errors due to the fact that the zones of coincidence are not vertical, but are segments of hyperboloids of revolution, are not important except in the neighborhood of the transmitting stations and this, in practice, means only in the immediate neighborhood of station A.

At any one flight level the sections points can be computed, and the coincidences caused to take place thereat, with as great accuracy as may be desired. At levels above and below that selected the coincidences will not take place immediately above the sections points if these are considered as laid out upon the ground, and the errors will become greater as station A is approached. The sections will be shorter than normal at levels below that chosen for the computation, and somewhat longer at elevations above that level. Again a compromise must be made; the sections points must be computed for some predetermined standard level, e. g., twelve to fifteen thousand feet, and the course computed for this level. Planes flying above or below this level must make the necessary allowances. If the standard flight level is properly chosen the approximations need never be great, and can probably ordinarily be neglected; it would only be for planes flying at extreme levels, either low or high, that the approximations would become sufficiently important so that they would have to be considered by the pilot.

Another method of minimizing this effect is to move station A to a position materially to one side of the airway, e. g., spaced from the end of the airway by the same distance as stations B or C. This distorts the section areas somewhat more than the symmetrical location, but this slight disadvantage may be more than compensated by the advantages gained thereby.

Another approximation involved is due to the fact that the signals are emitted from the slave stations B and C at intervals of integral numbers of counts. The maximum error that can result from this is one sixth of a microsecond, within which time the wave travels about one hundred sixty-four feet. The average error will be less than the wing span of modern commercial planes.

The system can be monitored by one or more coincidental receivers placed at fixed predetermined points along the airway. These would receive their coincidental signal once per second. If the signals failed to arrive it is easy to arrange them to send an alarm.

The utility of the method of controlled jitter is not limited to the navigating system here described, but can also be applied to more conventional navigation systems, such as Loran. Such an application makes possible a much simpler indicator than is now generally used. Thus, one Loran station can be operated at a fixed repetition rate, and if the pulses from this station are displayed on a cathode ray screen with the sweep circuit locked in at this rate or a sub-multiple thereof, the pulse will appear in a fixed position on the screen, whereas pulses from another station, operating at a slightly different repetition rate, will appear to travel slowly across the screen, passing through the fixed pulse at some epoch of its passage.

To use this effect to establish a Loran line of position in accordance with my invention, the master station is pulsed at some fixed rate, say 200 per second, and, additionally at the beginning of a predetermined cycle of operation, e. g., every 10 seconds or 2000 pulses, the master station transmits a characteristic timing signal. This can be a long pulse, a succession of short pulses, or any other easily recognizable code.

The pulses from the slave station are jittered in the same manner as for the airway navigation system already described, the jitter being so controlled that each interval will be either slightly longer or slightly shorter than the intervals between the pulses from the master station, and so that the cumulative difference in the intervals within the ten-second cycle will be twice the propagation time of the signals between the two stations. For example, the timing can be arranged so that the slave station emits its first pulse at the instant the cycling signal from the master station arrives thereat, and its succeeding signals can be advanced so that at the 2000th pulse the slave signal arrives at the master station at the instant its cycling pulse is emitted. The method of accomplishing this differs from that already described only in the frequency of the oscillator driving the counter, and in the fact that, in general, the change in the number of counts preset between interval pulses would be a constant.

With this arrangement the pulse from the slave station will traverse the field of the scope once in each ten-second cycle, and a Loran line of position can be established by timing the period between the characteristic signal, which initiates the cycle and the instant at which the slave station pulse on the scope passes the pulse from the master station, i. e., the instant of coincidence. With a stop-watch reading to one-tenth second time this would permit 1000 lines of position to be distinguished in the ten-second cycle.

Complete positioning of the Loran requires establishing the intersection of two lines of position. To prevent confusion between the pulses from the two slave stations the intervals between the pulses from one can be made slightly longer than the interval between master pulses, while those from the other can be made shorter. The slave station pulses will then traverse the screen of the oscilloscope in opposite directions, and their times of coincidence can be separately determined. Moreover, the signals of the two slave stations may be distinguished by any desired simple code, such as a single pulse from station B and a double pulse from station C. The first observed coincidence would establish the line of position in this case.

This modification of Loran has the advantage of placing all of the complex equipment at the transmitter, and reducing the equipment carried by the vehicle to be navigated to a simple cathode ray oscilloscope and a stop-watch.

It will be evident to those skilled in the art that the system of my invention is capable of numerous modifications, and I therefore do not wish to be restricted to the precise forms here described, but desire to be protected broadly within the scope of the following claims.

I claim:

1. A radio navigation system comprising a plurality of radio pulse transmitters, a master timing mechanism common to all of said transmitters for establishing a predetermined time relation between the pulses radiated thereby at the beginning of recurrent cycles of operation, means for transmitting a characteristic signal from one of said transmitters at the beginning of each cycle and pulsing it at regular intervals within each cycle, and means for pulsing another of said transmitters an equal number of times within said cycle and varying the intervals between pulses of said second transmitter by predetermined increments.

2. A radio navigation system in accordance with claim 1 wherein the pulsing means for said first mentioned transmitter comprises a stable oscillator of a frequency high in comparison with the length of said cycle, and an electronic counter driven by successive cycles of said oscillator and connected to recycle at the pulsing intervals and to pulse said transmitter at each recycling.

3. A radio navigation system in accordance with claim 1 wherein the pulsing means for said second mentioned transmitter comprises a stable oscillator of a frequency high in comparison with the length of said cycle, an electronic counter actuated by successive cycles of said oscillator and connected to recycle at a number of counts approximately corresponding to said regular intervals within said cycle and to pulse said transmitter at each recycling, and means for presetting said counter to any arbitrarily selected number of counts within its range simultaneously with said recycling, whereby the number of counts remaining prior to the succeeding recycling can be varied in any predetermined manner.

4. A radio navigation system in accordance with claim 1 wherein the pulsing means for said second mentioned transmitter comprises a stable oscillator of a frequency high in comparison with the length of said cycle, an electronic counter actuated by successive cycles of said oscillator and connected to recycle at a number of counts approximately corresponding to said regular intervals within said cycle and to pulse said transmitter at each recycling, and means for presetting said counter to any arbitrarily selected number of counts within its range simultaneously with said recycling, said presetting means comprising means external to said counter for pulsing each digit thereof, a programming strip including thereon means for actuating a selected number of said pulsing means in each of said intervals of said cycle, means for advancing said programming strip synchronously with said cycle, and means actuated concurrently with the radiation of said transmitter pulse for triggering said digit pulsing means.

5. A radio navigation system in accordance with claim 1 wherein the pulsing means for said second mentioned transmitter comprises a stable oscillator of a frequency high in comparison with the length of said cycle, an electronic counter actuated by successive cycles of said oscillator and connected to recycle at a number of counts approximately corresponding to said regular intervals within said cycle and to pulse said transmitter at each recycling, means for presetting said counter to any arbitrarily selected number of counts within its range simultaneously with said recycling, said presetting means comprising a row of photoelectric cells, one connected to pulse each digit of said counter when said cell is excited, a programming strip carrying optical apertures arranged in transverse rows thereon, the apertures in each row corresponding with the photoelectric cells connected to the digits to be preset in one interval of said cycle, means for advancing said programming strip over said photocells in synchronism with said cycle, a stroboscopic lamp positioned to illuminate said photocells through one of said rows of apertures, and means actuated concurrently with the radiation of said transmitter pulses for instantaneously exciting said lamp.

6. Means for transmitting pulses at varying predetermined epochs within successive cycles of operation which comprises an oscillator operating at a frequency which is high in comparison with the length of said cycles, a high speed counter actuated by said oscillator to count said cycles and to transmit recurrent pulses upon counting constant predetermined numbers of said cycles, a second high speed counter also actuated by said oscillator to count cycles thereof, and means actuated by said first counter to recycle said second counter and preset the same by predetermined numbers of counts at each recycling, whereby said second counter will transmit pulses at varying intervals depending on the number of counts to which it has been preset.

7. A system of radio navigation along a predetermined lane comprising a plurality of radio transmitters so related with respect to said lane that transmissions are received thereon from one of said transmitters in a direction generally longitudinal of said lane and from another of said transmitters from a direction transverse to said lane, means for transmitting from one of said transmitters a characteristic signal to initiate a cycle of operation, means for transmitting from said transmitters collectively groups of pulses, the pulses of each group including at least one pulse from each of said transmitters and the timing of the pulses within each group being such as to cause their arrival within one area along said lane in a characteristic time relation, the timing of the pulses in successive groups being such as to cause their arrival in said time relation at successive areas along said lane, the group transmitting means including means for transmitting at least one relatively broad pulse in each group from said first identified transmitter for identifying areas of substantial length along said lane and at least one relatively narrow pulse in each group from said second identified transmitter to identify lateral positions within said area with greater exactness, radio receiving means adapted to respond to said signal and pulses in said time relation and means fed by said receiving means for timing the interval in between the reception of said characteristic signal and a pulse group having said characteristic time relation.

8. A radio navigation system in accordance with claim 7 including two transmitters located respectively on each side of said lane to transmit signals generally laterally thereof and means for transmitting at least one relatively narrow pulse in each group from each of said last mentioned transmitters, and means fed by said receiving means for indicating differences in the interval between the times of arrival of said narrow pulses to indicate the lateral position of said receiving means with respect to said lane.

9. A radio navigation system in accordance with claim 8 wherein said radio receiving means includes a triple coincidence circuit, said characteristic time relation of said pulse groups being a triple coincidence.

10. A radio navigation system in accordance with claim 8 wherein said pulse group transmitting means includes means for transmitting in each pulse group relatively broad pulses from two of said transmitters timed to produce a delayed double coincidence followed by relatively narrow pulses from two transmitters timed to produce an approximate double coincidence, and means fed by said radio receiving means responsive respectively to such delayed double coincidences and approximate double coincidences.

11. A radio navigation system in accordance with claim 10 including means for measuring the deviation from actual coincidence of said narrow pulses in approximate double coincidence.

12. A radio navigation system comprising three radio transmitters spaced to form a triangle embracing a lane to be navigated, means for keying one of said transmitters to radiate a characteristic cycling signal followed by a succession of uniformly spaced pulses, means for keying each of the others of said transmitters to radiate a like number of pulses in each cycle and means for introducing variations of predetermined magnitude in the intervals between the pulses radiated from each of said other transmitters.

13. A radio navigational network comprising master transmitting means, a plurality of slave radio transmitters, radio responder means for keying said slave transmitters in response to signals from said master transmitter means, and means for cyclically keying said master transmitter means to produce timed successions of pulses from said slave transmitters, including means for varying the intervals between which pulses in each succession by predetermined amounts.

14. A radio navigation system comprising a master transmitter and at least one slave transmitter, means for keying said master transmitter at uniform intervals to produce synchronizing pulses, means in proximity to said slave transmitter for receiving said pulses, means actuated by pulses from said receiving means for measuring predetermined variable intervals of time following the reception of each pulse by said receiving means and for keying said slave transmitter at the end of each of said intervals.

15. A radio navigation system in accordance with claim 14 wherein said measuring means includes means for generating a timing wave of a period much smaller than the intervals between said synchronizing pulses, an electronic counter connected to count predetermined numbers of cycles of said timing wave and recycle after completing each such count, and means operative at each recycling to transmit a pulse from said slave transmitter.

16. A radio navigation system in accordance with claim 15 including means for presetting said counter to varying predetermined numbers of counts at each recycling.

17. A radio navigational instrument comprising radio receiving means adapted to receive signals of a plurality of different characteristic types, means connected to said receiving means for segregating signals of different characteristics into a plurality of circuits, electrical counting means so connected to said circuits as to count signals of one characteristic, said counting means including means responsive to other characteristic signals in another of said circuits for recycling said counting means and initiating a series of counts and means responsive to a coincidence of characteristic signals in a plurality of said circuits for translating the number of counts registered in such series into a sensible indication.

18. A radio navigational instrument comprising radio receiving means responsive to signals having different characteristics, means for segregating signals of different characteristics into a plurality of circuits, a coincidence circuit connected to two of said circuits and adapted to pass signals only upon occurrence of coincident signals in said two circuits, an electronic counter connected for counting operation by characteristic signals in a third of said circuits to be stopped from further counting by a signal passed by said coincidence circuit and to be recycled by a signal of still different characteristics in a fourth of said circuits, and means connected to said counter for giving a sensible indication in accordance with the number of counts registered when stopped by a signal from said coincidence circuit.

19. An instrument in accordance with claim 18 including pulse responsive means connected for actuation by pulses passed by said coincidence circuit and also pulses received from another of said circuits, means for measuring the interval between the pulses so received and means for giving an indication corresponding to such interval.

20. A navigation instrument in accordance with claim 18 for use in a system wherein the signal characteristics are determined by the length and spacing of such signals and the grouping thereof wherein said segregating means includes a delay line and gating means responsive to signals passed by said delay line to pass undelayed signals from said receiving means.

LUIS W. ALVAREZ.

References Cited in the file of this patent

UNITED STATES PATENTS

| Number | Name | Date |
|---|---|---|
| 1,615,712 | Loth | Jan. 25, 1927 |
| 2,403,600 | Holmes et al. | July 9, 1946 |
| 2,403,626 | Wolff et al. | July 9, 1946 |
| 2,405,238 | Seeley | Aug. 6, 1946 |
| 2,408,048 | Deloraine et al. | Sept. 24, 1946 |
| 2,419,525 | Alford | Apr. 29, 1947 |
| 2,428,966 | Gage | Oct. 14, 1947 |
| 2,436,376 | Bown | Feb. 24, 1948 |
| 2,441,956 | Deloraine et al. | May 25, 1948 |
| 2,444,426 | Busignies | July 6, 1948 |
| 2,487,822 | McLamore et al. | Nov. 15, 1949 |
| 2,508,565 | Chance | May 23, 1950 |
| 2,514,436 | Alvarez | July 11, 1950 |
| 2,515,464 | Minneman | July 18, 1950 |